US010213971B2

(12) United States Patent
Mastronardi et al.

(10) Patent No.: US 10,213,971 B2
(45) Date of Patent: Feb. 26, 2019

(54) FORMING MACHINE FOR FORMING A HOLLOW BODY, IN PARTICULAR A CASING OF A SOLID PROPELLANT ENGINE, AND DEPOSIT HEAD FOR SUCH A FORMING MACHINE

(71) Applicant: AVIO S.p.A., Rome (IT)

(72) Inventors: Roberto Mastronardi, Rome (IT); Rosario Rocco Repole, Rapone (IT); Massimiliano Cardelli, Rome (IT)

(73) Assignee: AVIO S.P.A, Rome (IT)

( * ) Notice: Subject to any disclaimer, the term of this patent is extended or adjusted under 35 U.S.C. 154(b) by 359 days.

(21) Appl. No.: 15/148,575

(22) Filed: May 6, 2016

(65) Prior Publication Data
US 2017/0044657 A1 Feb. 16, 2017

(30) Foreign Application Priority Data

May 6, 2015 (IT) .................. 102015000014030

(51) Int. Cl.
F02K 9/34 (2006.01)
B29C 70/38 (2006.01)
B29C 53/80 (2006.01)
B29C 53/66 (2006.01)

(52) U.S. Cl.
CPC ........ B29C 70/388 (2013.01); B29C 53/8016 (2013.01); F02K 9/34 (2013.01); *B29C 53/66* (2013.01); *F05D 2230/31* (2013.01); *Y10T 156/1788* (2015.01)

(58) Field of Classification Search
CPC ... B29C 70/388; B29C 53/66; B29C 53/8016; Y10T 156/1788
See application file for complete search history.

(56) References Cited

U.S. PATENT DOCUMENTS 3,775,219 A 11/1973 Karlson et al.
4,569,716 A * 2/1986 Pugh .................. B29C 66/1122
156/510

(Continued)

FOREIGN PATENT DOCUMENTS

EP 2230069 A2 9/2010
WO 2006060270 A1 6/2006

OTHER PUBLICATIONS

Italian Search Report dated Jan. 11, 2016 for Italian application No. IO 55886.

*Primary Examiner* — Philip C Tucker
*Assistant Examiner* — John Blades
(74) *Attorney, Agent, or Firm* — Ohlandt, Greeley, Ruggiero & Perle, LLP

(57) ABSTRACT

In a machine for forming a hollow body, for example a casing of a solid propellant engine, a tensioned and guided belt comprising a layer of adhesive material and a protective strip is fed from a deposit head, supported by a robot and comprising an unwinding device for unwinding the belt, a winding device for winding the strip, a first pressing roller for pressing the strip and the layer of adhesive material and rotatable about an axis thereof orthogonal to the feed path of the belt and a second pressing roller for pressing the adhesive material and the strip, rotatable about an axis thereof forming an angle other than 90° to the feed path and movable in opposite directions in a direction transversal to feed path.

16 Claims, 4 Drawing Sheets

(56) References Cited

U.S. PATENT DOCUMENTS

| | | | | |
|---|---|---|---|---|
| 4,882,007 A | * | 11/1989 | Lengen | B29C 70/388 |
| | | | | 156/523 |
| 4,997,510 A | * | 3/1991 | Shinno | B29C 70/388 |
| | | | | 156/361 |
| 9,421,744 B2 | * | 8/2016 | Shair | B29C 70/38 |
| 2010/0252183 A1 | * | 10/2010 | Munaux | B29C 70/388 |
| | | | | 156/202 |
| 2012/0298309 A1 | * | 11/2012 | Arakawa | B29C 70/388 |
| | | | | 156/538 |
| 2014/0028831 A1 | * | 1/2014 | Cayment | B29C 70/388 |
| | | | | 348/88 |
| 2016/0250836 A1 | * | 9/2016 | De Mattia | B32B 37/0053 |
| | | | | 156/247 |

* cited by examiner

FORMING MACHINE FOR FORMING A HOLLOW BODY, IN PARTICULAR A CASING OF A SOLID PROPELLANT ENGINE, AND DEPOSIT HEAD FOR SUCH A FORMING MACHINE

The present invention relates to a forming machine for forming a hollow body, in particular a casing of a solid propellant engine.

In particular, the present invention relates to a forming machine that finds application in plants for manufacturing engine bodies using filament winding technology.

BACKGROUND OF THE INVENTION

As is known, this technology contemplates using a removable forming drum, winding a plurality of circumferential reinforcing filiform elements on the drum, covering the filiform elements by winding an adhesive coating tape thereon and pressing the adhesive belt against the filiform elements.

The adhesive belt, usually wound on reels, comprises a layer of carbon-fibre-based adhesive material and a protective or releasing strip arranged on only one side of the layer of adhesive material.

The winding and successive pressing of the adhesive belt, initially performed by hand and, later, using mechanized apparatuses, have been found to be extremely complex and delicate operations. In fact, incorrect or imprecise winding of the adhesive belt or an inadequate or uneven pressing of the adhesive belt cause the formation of blisters, contaminated areas and subsequent delamination and, in general, the formation of structural defects that result in inevitable rejection of the casing.

In current mechanized apparatuses, the winding and subsequent pressing are carried out using a deposit head supplied with the above-mentioned adhesive belt and moved by robotized arms. The application head is usually constituted by a belt unwinding device and a protective strip removal and recovery device.

In known applications, the protective strip is separated from the layer of adhesive material before the adhesive material is pressed against the forming drum and the reinforcing filiform elements.

In known heads, pressing is performed using a pressing roller that acts directly on the layer of adhesive material after the protective strip has been removed, and is rotatable about an axis orthogonal to the feed direction of the adhesive belt.

Although mechanized apparatuses of the above-described type are used, they are not entirely satisfactory, not only because they generate positioning errors and cause imprecise movement of the head along complex deposit paths, but above all because they are unable to avoid blistering and delamination on the casing being formed, in particular, as the geometrical/size characteristics of the casing change.

Better position control of the deposit head could be achieved by replacing the robotized arms with gantry movement structures, much more rigid and precise. However, these structures do not find practical application in forming plants using filament winding as they are extremely bulky, as well as being complex and expensive.

In addition, known mechanized apparatuses are not able to prevent contamination of the deposited adhesive material and to ensure uniform and homogeneous distribution of the adhesive material.

The foregoing is basically ascribable to the particular way the deposit head is implemented, the pressing roller of which soils itself, as it acts directly on the layer of adhesive material, often carrying part of the adhesive material with it, which it later releases when the chemical-physical characteristics of the material have changed.

Apart from this, during the depositing phase, the adhesive material is exposed to external contaminants on one hand, and lack of guidance on the other.

The lack of guidance of the adhesive material while being deposited inevitably results in positioning and compaction errors, which are even more pronounced for the leading and trailing portions of the adhesive belt.

Moreover, known mechanized apparatuses do not allow producing a uniform and homogeneous coating independently of the geometrical characteristics of the casing and, in particular, in the presence of protrusions or ribbing transversal to the belt's feed direction.

In fact, in these conditions, since it rotates about an axis orthogonal to the feed direction of the belt, the pressing roller is not able to compact the material in areas close to steps, with which it inevitably interferes and close to which blisters form or flaking takes place.

Lastly, the known solutions often make the application of adhesive materials difficult, as the latter, by their nature, tend to adhere more to the protective strip than to the reinforcing elements. In fact, in such cases, and especially in the phase of joining the belt's leading portion to the forming drum, it is often difficult to detach the adhesive material from the strip and make it adhere to the forming drum.

SUMMARY OF THE INVENTION

The object of the present invention is to provide a forming machine for forming a hollow body, in particular a casing of a solid propellant engine, which enables the above-mentioned problems to be solved in a simple and inexpensive manner.

According to the present invention, a forming machine is provided for forming a hollow body, in particular a casing of a solid propellant engine, as claimed in claim 14.

The present invention also relates to a deposit head for a forming machine for forming a hollow body.

According to the present invention, a deposit head is provided for a forming machine for forming a hollow body; the deposit head comprising a support frame adapted to be coupled to a moving member, motorized supply means and guide means carried by said support frame to feed, along a predefined feeding path, a belt comprising a layer of adhesive material and a protective strip arranged on only one side of said layer of adhesive material, motorized winding means for winding said protective strip and carried by said frame, and a first pressing roller for pushing said strip and said layer of adhesive material toward a deposit surface of said adhesive material and rotatable about an axis thereof that is orthogonal to said feeding path, characterized by further comprising a second pressing roller for pushing said strip and said adhesive material toward said deposit surface; said second pressing roller being carried by said support frame and being rotatable about an axis thereof forming, with said feeding path, an angle other than 90°; first actuation and guide means being interposed between said support frame and said second pressing roller for moving the second pressing roller in opposite directions along a direction transversal to said feeding path.

BRIEF DESCRIPTION OF THE DRAWINGS

The invention will now be described with reference to the accompanying drawings, which illustrate a non-limitative embodiment, in which.

DETAILED DESCRIPTION OF THE INVENTION

Figure 1:
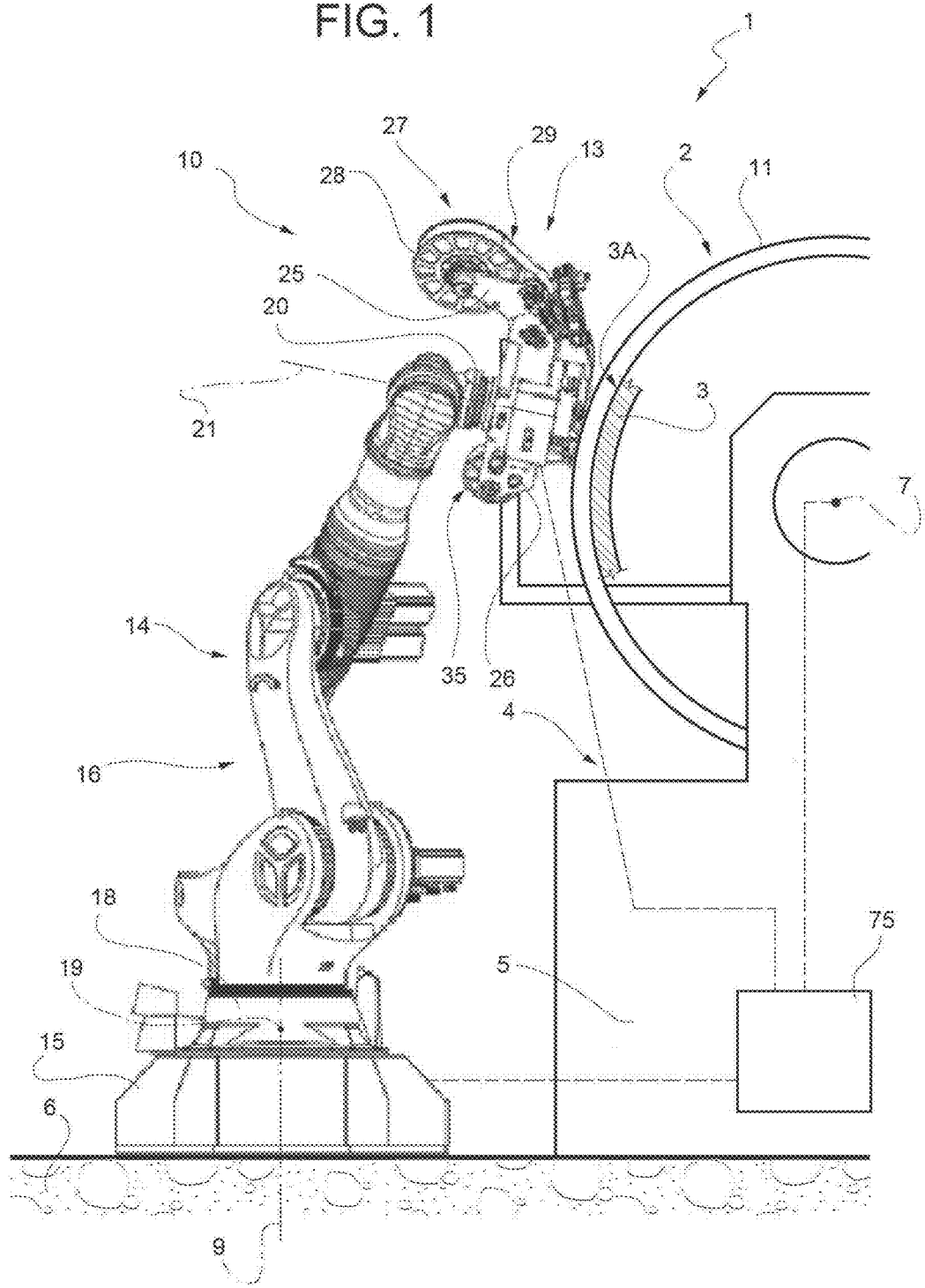
FIG. 1 shows, in side elevation, a machine for forming a casing of a solid propellant engine and made according to the principles of the present invention.

In FIG. 1, reference numeral 1 indicates, as a whole, a machine for making a hollow body in general, and for making a (schematically shown) monolithic casing 2 in a composite material for a solid propellant engine (not shown) in particular, to which the following description shall make explicit reference, but without any loss of generality.

The machine 1, which is integrated in a forming plant, not. visible in the accompanying drawings, comprises a removable forming drum 3 of known type, which is coupled to its own. support structure 4 and is motorized to rotate about its horizontal axis 7. The structure has a base 5 fastened to a floor 6.

The machine 1 also comprises a known winding unit, not shown, for winding a plurality of reinforcing filiform elements, not visible in the accompanying drawings, on the drum 3, and a robotized unit 10 for creating a layer 11 of elongated filiform elements spread over the drum 3. The winding unit and the robotized unit 10 are expediently arranged on opposite sides of the drum 3.

Always referring to 1, the robotized unit 10 comprises a deposit head 13 to form layer 11 and an anthropomorphic robot 14, opportunely with six controlled axes. Preferably, the robot 14 comprises a base 15 fastened to the floor 6 next to base 5 in predefined and settable positions, for example by means of reference pins.

The robot 14 also comprises a motorized articulated arm 16 protruding upwards from the base 15 in a position facing the structure 4 and an outer lateral surface 3A of the drum 3.

The articulated arm 16 has a lower end portion 18 coupled to the base 15 to translate in opposite directions along a direction 19 parallel to the axis 7 of the drum 3, and a free upper portion 20 coupled to the head 13 in a rotatable manner about an axis 21.

Figure 2:
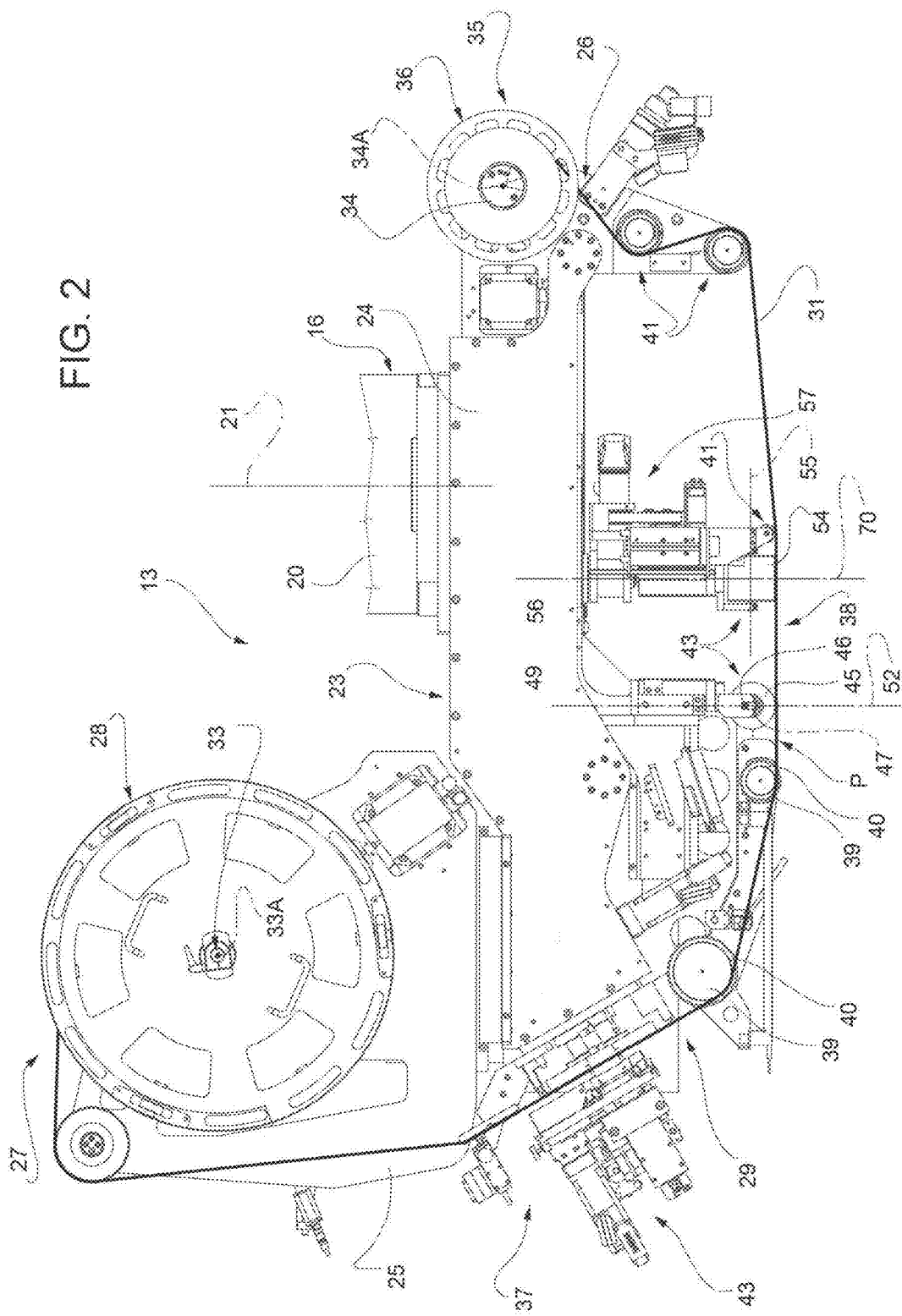
FIG. 2 is a side view, on a much larger scale, of a detail of FIG. 1.

Referring to FIG. 2, the deposit head. 13 comprises an. elongated, boxed support frame 23, which has an intermediate portion 24 connected to portion. 20 of the articulated arm 16 and two longitudinally opposite ends, indicated by reference numerals 25 and 26.

Portion 25 supports an unwinding device 27 for unwinding a reel 28 of belt constituted by a layer 30 of adhesive material to deposit on the drum 3 and a protective strip 31 (FIG. 3), preferably Teflon-coated paper, designed to be removed from layer 30, as shall be explained hereinafter.

Device 27 comprises a motorized unwinding shaft 33, which can rotate about its axis 33A and on which the reel 28 is fitted.

Portion 26, instead, supports a motorized shaft 34, which can rotate about an axis 34A parallel to axis 33A and constitutes part of a winding device 35 for winding only the protective strip 31 on a reel 36 and drawing the belt 29 unwound from reel 28.

Through the strip 31 wound on reel 36 and by overcoming the predefined counter force exerted by the unwinding device 27, the winding device 35 tensions and draws the belt 29 along a path P feeding or supplying the belt 29 through a cutting station 37 and a transfer station 38 for transferring the layer 30 of adhesive material onto the drum 3 to cover the elongated reinforcing elements.

The belt 29 is guided between the cutting station 37 and the transfer station 38 by a pair of idle rollers 39. Each of the rollers 39 rolls in contact with the protective strip 31 without ever interacting with the layer 30 of adhesive material. Each roller comprises a pair of circumferential ribs 40, which protrude radially from the outer surface of the respective roller 39 and are axially spaced apart from each other by an amount approximating by excess to the width of the belt 29, so as to define axial stops for the sides of belt 29 when the strip 31 is arranged in contact with the surface of the respective roller 38.

In the same way, the strip 31 is guided between the transfer station 38 and the rewinding device 35, by idle rollers 41 constructively similar to rollers 39.

The cutting station 37 is arranged at the outlet from the unwinding device 27 and houses a cutting device 43, in itself known and, opportunely, of the ultrasonic type. The cutting device is arranged in a position facing the layer 30 of adhesive material and is controlled to cut only the layer 30 of adhesive material transversely and not to interfere with the protective strip 31.

In the transfer station 38, instead, a pressing unit 43 is arranged for pushing the layer 30 of adhesive material towards the drum 3 and against the reinforcing filiform elements. The transfer station 38 is arranged substantially on the opposite side of the intermediate portion 24 with respect to the upper portion 20 of the articulated arm 16.

Figure 3:
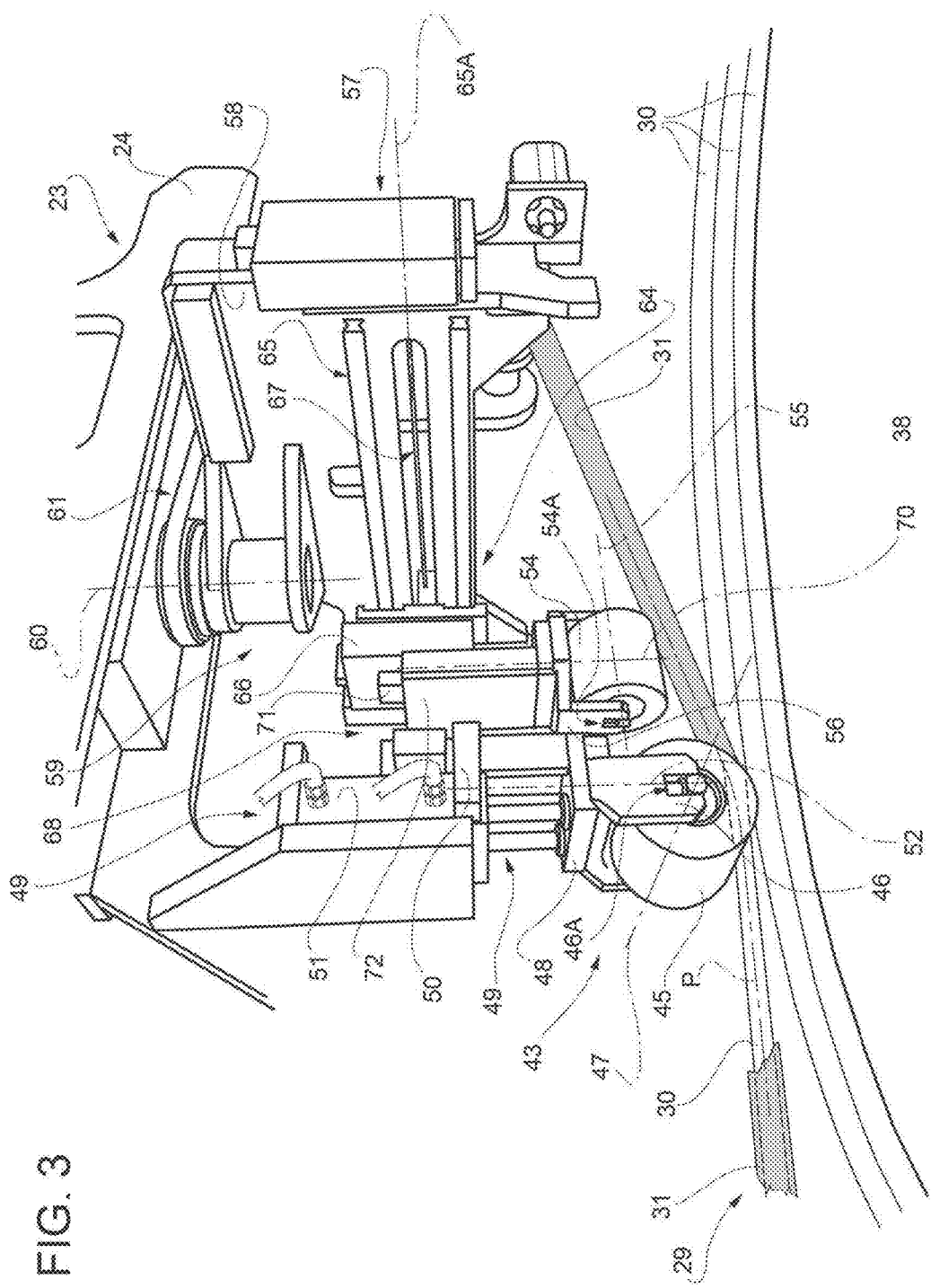
FIG. 3 is an enlarged perspective view of a detail of FIG. 2, with parts removed for clarity.

Referring to FIG. 2 and, in particular, to FIG. 3, the pressing unit 43 comprises an idle pressing roller 45 for axial compaction. The pressing roller 45 comprises a hub covered in an elastomeric material and coupled to a fork 46 through the interposition of elastic elements 46A, for example compression springs. The roller 45 rotates about its axis 47 orthogonal to the path P and, in use, is in contact with the strip 31. The fork 46 is firmly connected to a slide 48 of a sliding guide device 49, of known type and not described in detail, the guide 50 of which is firmly connected to the intermediate portion 24 of the frame 23. The slide 48 is movable in opposite directions towards and away from the strip 31 under the force of an actuator 51, preferably pneumatic and controlled by proportional valve means, in a direction 52 orthogonal to the path P, parallel to axis 21 and orthogonal to axes 33A and 34A. The fork 46 is instead locked in an angularly fixed position about direction 52 with respect to the frame 23.

Still referring to the FIGS. 2 and 3, unit 43 also comprises a further pressing roller 54 for circumferential pressing and compaction of the adhesive material 30 on the drum 3 and against the reinforcing filiform elements.

Roller 54, which is arranged downstream of roller 45 in the feed direction of the belt 29, namely between roller 45 and rollers 41, in use, acts like roller 45 against the strip 31 and is implemented in the same way as roller 45.

Roller 54 is idly coupled to an associated fork 56, always through the interposition of elastically yielding elements 54A, to rotate about its axis 55.

The fork 56 coupled to the frame 23 through the interposition of an actuating unit 57, in turn comprising a movable structure 58 coupled to the frame 23 through the interposition of a hinge 59. The hinge has a hinge axis 60 parallel to direction 52 and to axis 21. A. motorized actuating unit 61 is provided between the structure 58 and the frame 23 to rotate the structure 58 with respect to the frame 23 and roller 45 in opposite directions about axis 60. Unit 61 is opportunely of the belt type.

Always referring to FIG. 3, the actuating unit 57 also comprises a motorized sliding guide assembly 64, which comprises a rectilinear guide 65 that is firmly connected to the structure 58 and extends in a direction 65A, orthogonal to axis 60 and direction 52 and transversal to the path P. Assembly 64 comprises a motorized slide 66, which is coupled to the guide 65 and is movable in opposite directions along the guide 65 under the action of an actuator unit 67, preferably of the belt type.

Between the slide 66 and the fork 56 of roller 54, unit 43 comprises a further sliding guide assembly 68 constructively similar to assembly 49 for moving fork 56 in opposite directions towards and away from the strip 31 in a direction 70 parallel to direction 52 and axis 60. In particular, assembly 68 comprises a rectilinear guide 71 parallel to direction 70 and integrally connected to slide 66 and a motorized slide 72 coupled to guide 71 and carrying the integrally connected fork 56.

In use, starting from the condition where the filiform elements are wound on the drum 3, a synchronization and control unit 75 (FIG. 1) sets the drum 3 in rotation about its axis 7 and controls the robot 14, which first positions the head 13 with respect to the drum 3 and then moves the head 13, following a predetermined motion profile such as to allow the desired covering of the filiform elements deposited on the drum 3. Simultaneously with the advancement of the head 13, devices 27 and 35 are activated and the belt 29 advances along the path P.

When the belt 29 enters station 38, roller 45, positioned in its advanced pressing position, forces the layer 30 of adhesive material against, the drum 3, making it adhere to the underlying filiform elements. At this point, the belt 29 advances in station 38, moving in unison with the drum 3, without interacting with roller 54, which is kept in its retracted position until the first idle roller 41 is reached, beyond which, or rather at the outlet from the station 38, the change in direction of the path P causes the progressive detachment of the strip 31 from the layer of adhesive material, which remains on the drum. 3 while the strip 31 is drawn forwards by the rewinding device 35 and always guided by rollers 41.

Figure 4:
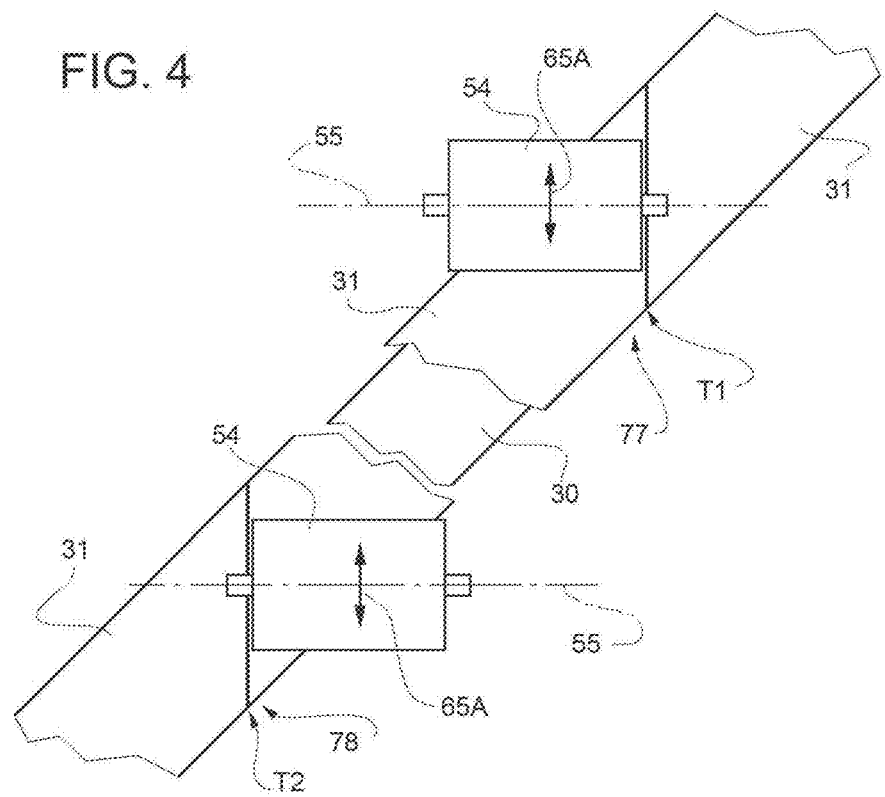

Referring to FIG. 4, during the initial and final phases of transfer, where there is a leading portion 77 and a trailing portion 78, respectively, of the adhesive material delimited by two consecutive transverse cuts T1 and T2 of only the adhesive material by means of device 43, roller 54, until now kept in a retracted rest position, shown in FIG. 3, is advanced towards the drum 3 and brought to the pressing position. After this, roller 54 is translated in direction 65, pressing parts 77 and 78.

Still referring to FIG. 4, prior to its advancement, roller 54 is oriented by rotating the movable structure 58 about axis 60 such that the axis 55 of rotation forms a right angle to the cuts T1 and T2. In this way, all areas of portions 77 and 78 are pressed against the drum 3, ensuring perfect adhesion of the areas of end portions 77 and 78, including the areas at the extremities delimited by cuts T1 and T2.

Figure 5:
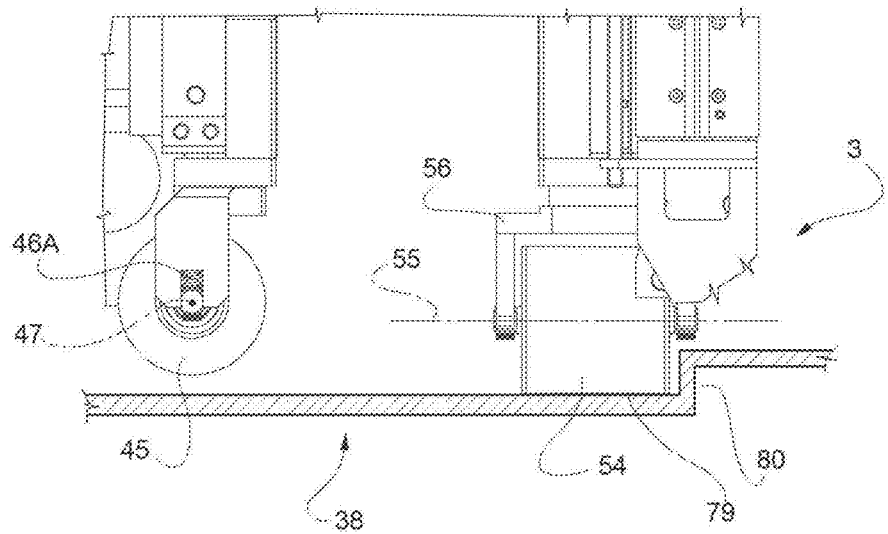
FIGS. 4 and 5 schematically show two different operating conditions of a detail of FIG. 2.

Referring to FIG. 5, there is similar uniformity of adhesion of an end portion 79 of the adhesive material arranged next to a step 80 of the drum 3 that is transversal, orthogonal in this specific case, to the feed path P of the belt 29. In fact, in this condition, the axis 55 of roller 54 is arranged orthogonally to the step 80 and roller 54 completes the pressing of the adhesive material next to the step 80 during it movement in direction 65A, as shown in FIG. 5.

From the foregoing, it is evident how the constant connection between the layer 30 of adhesive material and the strip 31 and the constant tensioning of the belt enable always guiding the adhesive material 30 along a predefined and unvarying path P and always arranging the adhesive material 30 along a predefined coating trajectory. In this way, the adhesive material is always distributed uniformly on the reinforcing filiform elements without occurrences of build-up or lack of adhesive material.

In addition to this, it is evident that the use of two distinct pressing rollers, of which one is orientable, enable uniformly compacting, i.e. with the total absence of bubbles or creases, all of the adhesive material on the reinforcing filiform elements, and therefore also including the leading and trailing portions independently of the direction of the cuts T1 and T2.

The lack of direct contact between the pressing rollers 45 and 54 and the adhesive material allows having pressing rollers that are always clean and achieving uniform distribution of the adhesive material.

In addition to the foregoing, the constant coupling between the adhesive material and the strip and the presence of pressing roller 54 enable performing the transfer even when using adhesive materials with low adhesiveness, without this causing difficulties in adhesion of the leading portions 77 of the layer of adhesive material to the drum 3.

In addition to this, the lack of contact between pressing rollers and adhesive material avoids, before everything else, the rollers 45 and 54 becoming soiled and consequently dragging portions of adhesive material in rotation and, in any case, contamination of the adhesive material, which is always protected by the strip 31.

The invention claimed is:

1. A deposit head for a forming machine for forming hollow bodies; the deposit head comprising a support frame adapted to be coupled to a moving member, motorized supply means and guide means carried by said support frame to feed, along a predefined feeding path, a belt comprising a layer of adhesive material and a protective strip arranged on only one side of said layer of adhesive material, motorized winding means for winding said protective strip and carried by said frame, and a first pressing roller for pushing said strip and said layer of adhesive material toward a deposit surface of said adhesive material and rotatable about an axis thereof that is orthogonal to said feeding path, characterized by further comprising a second pressing roller for pushing said strip and said adhesive material toward said deposit surface; said second pressing roller being carried by said support frame and being rotatable about an axis thereof forming, with said feeding path, an angle other than 90°; first actuation and guide means being interposed between said support frame and said second pressing roller for moving the second pressing roller in opposite directions along a direction transversal to said feeding path.

2. A head according to claim 1, characterized in that said transversal direction is a rectilinear direction.

3. A head according to claim 1, characterized in that said second pressing roller is arranged downstream of said first roller in the feeding direction of said belt.

4. A head according to claim 1, characterized in that it comprises a hinge interposed between said second pressing roller and said support frame and having a hinge axis orthogonal to said transversal direction and to the rotation axis of said first roller; motorized means being provided for rotating said second roller in opposite directions about said hinge axis.

5. A head according to claim 4, characterized in that it comprises motorized actuation means for moving said second pressing roller in opposite directions along a further direction parallel to said hinge axis.

6. A head according to claim 5, characterized in that. said actuation means are interposed between said second roller and said first actuation and guide means.

7. A head according to claim 4, characterized in that said hinge is interposed between said support frame and said first actuation and guide means.

8. A head according to claim 4, characterized by comprising a movable structure carrying said second pressing roller, said first actuation and guide means, and said actuation means; said hinge being interposed between said frame and said movable structure.

9. A head according to claim. 1, characterized in that both said first and second pressing rollers, in use, roll in contact with said protective strip.

10. A head according to claim 1, characterized in that it comprises a cutter for transversally cutting only said layer of adhesive material.

11. A head according to claim 10, characterized in that said cutter is arranged upstream of said first and second pressing rollers in the feeding direction of said belt.

12. A head according to claim. 1, characterized in that it comprises means for guiding said belt along said feeding path; said guide means comprising said unwinding means and idle rollers distributed along said path and having radial support surfaces for the longitudinal edges of said belt.

13. A robotized unit for a forming machine for forming a hollow body, in particular a casing of a solid propellant engine; the unit comprising a base which can be fixed to the floor and a robotized articulated arm protruding upward from said base, and a deposit head for depositing an adhesive material coupled to a free end of said articulated arm and implemented as claimed in claim 1.

14. A forming machine for forming a hollow body, the machine comprising a forming drum which rotates about an axis thereof, a head for feeding and depositing an adhesive material on said forming drum, and a mover adapted to move said head with respect to said drum; the deposit head being implemented as claimed in claim 1.

15. A machine according to claim 14, characterized in that both said first and second pressing rollers are arranged, in use, on the opposite side of said strip with respect to said forming drum.

16. A machine according to claim 14, characterized in that said means for moving said head comprise a robotized unit as claimed in claim 13.

* * * * *